US006076649A

United States Patent [19]

Waldorff, Jr.

[11] Patent Number: 6,076,649

[45] Date of Patent: Jun. 20, 2000

[54] PROGRAMMABLE MULTIPLE COIN TUBE CHANGER

[75] Inventor: Charles Alan Waldorff, Jr., Chesterfield, Mo.

[73] Assignee: Coin Acceptors, Inc., St. Louis, Mo.

[21] Appl. No.: 09/165,167

[22] Filed: Oct. 1, 1998

[51] Int. Cl.[7] .......... G06F 7/00; G07D 3/00

[52] U.S. Cl. .......... 194/217; 453/3

[58] Field of Search .......... 194/217; 453/17, 453/3, 4

[56] References Cited

U.S. PATENT DOCUMENTS

| | | | |
|---|---|---|---|
| 4,512,453 | 4/1985 | Schuller et al. | 194/217 |
| 5,056,643 | 10/1991 | Kirberg | 194/202 |
| 5,154,272 | 10/1992 | Nishiumi et al. | 194/217 |
| 5,400,891 | 3/1995 | Winstanley | 194/350 |
| 5,944,601 | 8/1999 | Hayashi et al. | 453/61 |

FOREIGN PATENT DOCUMENTS

| | | | |
|---|---|---|---|
| 2186051 | 3/1998 | Canada . | |
| 2246897 | 2/1992 | United Kingdom | 194/350 |
| 2326507 | 12/1998 | United Kingdom . | |

*Primary Examiner*—Robert P. Olszewski
*Assistant Examiner*—Bryan Jaketic
*Attorney, Agent, or Firm*—Haverstock, Garrett & Roberts LLP

[57] ABSTRACT

A programmable multiple coin tube changer for accepting and storing coins of different denomination comprises a plurality of coin tubes with each coin tube for storing one coin denomination and each coin tube being removable from the changer in order to reconfigure the coin tubes, circuitry for initiating a payout configuration mode whenever the coin tubes are reconfigured from an initial configuration to a subsequent configuration, circuitry for selecting which one of the coin tubes are to store a particular coin, a mechanism for routing a particular coin to the coin tube which has been selected for storing that particular coin, and a memory for storing information corresponding to the coin tube which has been selected for storing that particular coin. The programmable multiple coin tube changer also has the capability of accepting one or more coins which were previously rejected by the changer and rejecting one or more coins which were previously accepted by the changer.

19 Claims, 4 Drawing Sheets

PROGRAMMABLE MULTIPLE COIN TUBE CHANGER

BACKGROUND OF THE INVENTION

The present invention relates to a multiple coin tube changer capable of accepting and storing different coin denominations and in particular to a programmable multiple coin tube changer which is capable of being configured and programmed to accept and store any particular combination of coin denominations.

Vending machines typically include coin changer devices for accepting coins of different denominations. These coin changer devices function to authenticate each of the coins inserted into the vending machine and to determine the denomination of each of the coins. Once this function is accomplished the coins are routed within the coin changer device to one of three possible destinations. The first destination, assuming the coin has been determined to be acceptable, is to a coin tube where the coin may be stored for subsequent payout or escrow purposes. The second possible destination, again assuming the coin is acceptable and the coin tube to which it should be routed is full, is to a cash box for later retrieval by a route man or other service personnel. A coin which is deemed unacceptable is typically returned to the customer via a coin return cup associated with the vending machine.

Presently the demand for vending machines capable of accepting and paying out change from four coin tubes for different coin denominations is increasing. Typically coin changers having four coin tubes have been constructed having four different coin tubes with each coin tube storing one coin denomination. However, there are circumstances wherein it would be desirable to reconfigure the coin tubes to receive and store coin denominations in different combinations. For example, a coin changer may be constructed initially at the factory to accept nickels, dimes, quarters, and dollar coins in each of the four coin tubes. A situation may be called for where it is required to deviate from the original setup. Again for example, it may be desirable for the coin changer to store more quarters than dollar coins and it would be difficult to reconfigure the coin changer on site or in the field to achieve this new mix. Additionally, other equipment, such as a field programmer or other similar type device, must be employed in combination with the coin changer to program the coin changer for the new coin tube configuration.

Accordingly, it is desirable and advantageous to provide a programmable multiple coin tube changer having coin tubes which are reconfigurable to accept coins of any denomination in any combination of coin tubes. Additionally, it would be advantageous to have a programmable multiple coin tube changer which would not require other equipment to be used to program the coin changer.

SUMMARY OF THE INVENTION

The programmable multiple coin tube changer for accepting and storing coins of different denominations of the present invention comprises a plurality of coin tubes with each coin tube for storing one coin denomination and each coin tube being removable from the changer in order to reconfigure the coin tubes, means for initiating a payout configuration mode whenever the coin tubes are reconfigured from an initial configuration to a subsequent configuration, means for selecting which one of the coin tubes are to store a particular coin, means for routing a particular coin to the coin tube which has been selected for storing that particular coin, and means for storing information corresponding to the coin tube which has been selected for storing that particular coin.

In another form of the present invention, a programmable multiple coin tube changer for accepting and storing a set of coins of different denominations and for rejecting one or more coins from within the set comprises means for initiating a payout configuration mode whenever a coin which has been previously rejected by the changer needs to be accepted by the changer, means for routing a previously rejected coin through the changer, and means for storing information corresponding to the previously rejected coin which is now to be accepted by the changer.

Another form of the present invention is a programmable multiple coin tube changer for accepting and storing a set of coins of different denominations and for rejecting one or more coins from within the set which comprises a plurality of coin tubes with each coin tube for storing one coin denomination and each coin tube being removable from the changer in order to reconfigure the coin tubes, a cashbox for storing coins, means for initiating a payout configuration mode whenever the coin tubes are reconfigured from an initial configuration to a subsequent configuration, means for selecting which one of the coin tubes or the cashbox are to store a particular coin, means for routing a particular coin to the coin tube or the cashbox which has been selected for storing that particular coin, and means for storing information corresponding to the coin tube or the cashbox which has been selected for storing that particular coin.

Accordingly, it is an object of the present invention to provide a programmable multiple coin tube changer which is capable of being configured and programmed to accept various different coin denominations with each coin tube storing one coin denomination.

It is another object of the present invention to provide a programmable multiple coin tube changer which is easily installable in and operable with existing vending machines.

It is a further object of the present invention to provide a programmable multiple coin tube changer which is easily programmed by service personnel and which does not require other devices to be used to program the coin changer.

A further object of the present invention is to provide a programmable multiple coin tube changer which is programmable to enable and disable acceptance of one or more coins within a set of coins.

Another object of the present invention is to provide a programmable multiple coin tube changer which is capable of having coin tubes which are easily removable or reconfigurable within the changer and once the coin tubes are reconfigured the changer is easily programmed to accept different coin denominations based upon the reconfigured coin tubes.

These and other objects and advantages of the present invention will become apparent after considering the following detailed specification in conjunction with the accompanying drawings, wherein:

DETAILED DESCRIPTION OF THE PREFERRED EMBODIMENTS

Figure 1:
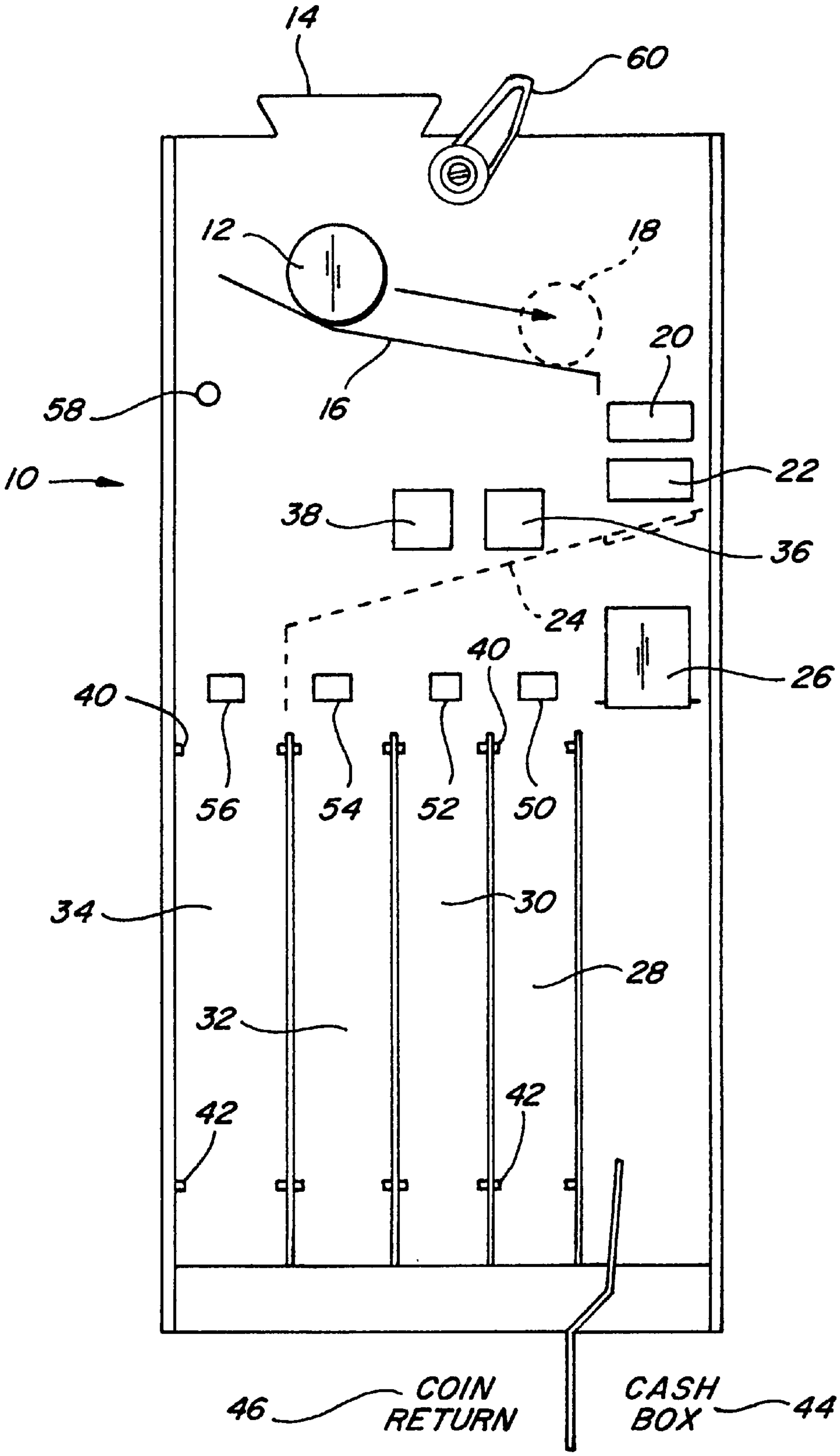
FIG. 1 is a diagrammatic view of a programmable multiple coin tube changer of the present invention depicting in simplified form various possible coin paths in and/or through the changer.

Referring now to the drawings, wherein like numerals refer to like items, number 10 identifies a preferred embodiment of the programmable multiple coin tube changer constructed according to the present invention. With reference now to FIG. 1, the programmable multiple coin tube changer 10 is typically installed for use in a vending machine or like device. A coin 12 may be deposited at a coin inlet 14 and thereafter rolls down an upper inclined surface 16 to pass a coin sensing means 18. The coin sensing means 18 is used to determine whether the deposited coin 12 is acceptable or genuine and what the denomination of the coin 12 is. Coin sensing means 18 may comprise optical coin sensors, inductive coin sensors, or combinations thereof, all of which are well known devices for detecting and validating coins. Examples of such coin sensing means or detection and validation means for use in the present programmable multiple coin tube changer are disclosed in U.S. Pat. Nos. 4,625,852, 4,646,904, 4,739,869, 4,763,769, and 5,293,979, all of which are assigned to the assignee of the present invention.

After the coin sensing means 18 there is an accept/reject door 20 which is operated to direct the coin 12 to a sorting door 22. The sorting door 22 is used to direct the coin 12 to either a lower incline surface 24 or to a cashbox door 26. The coin changer 10 further includes coin tubes 28, 30, 32, and 34 for storing coins. To rout a coin 12 to the coin tube 28 requires that all of the doors 20, 22, and 26 be operated. Coin tube 30 has a gate 36, associated thereto, which if actuated will send the coin 12 into the coin tube 30. The coin tube 32 also has a gate 38 which if actuated will direct the coin 12 into the coin tube 32. Each of the coin tubes 28, 30, 32, and 34 may contain a stack of coins which are stored for subsequent payout or refund to a customer. Additionally, all of the coin tubes 28, 30, 32, and 34 have an upper coin tube sensor 40 and a lower coin tube sensor 42 for determining whether each of the coin tubes is either full or empty. The coin tube sensors 40 and 42 may take the form of optical, inductive, mechanical, or other known type sensors which are capable of sensing the presence or absence of a coin.

The path of the coin 12 may also be directed to a cash box 44 if it is determined that the coin tube 28, 30, 32, or 34 to which the coin 12 should be sent is full. A full condition is sensed when the upper coin tube sensor 40 is activated. In this manner the coin 12 will pass the operated accept/reject door 20 and the sorting door 22 will direct the coin 12 toward the cashbox door 26. With the cashbox door 26 not being operated the coin 12 will fall into the cashbox 44. If the coin 12 has been determined to be unacceptable then the coin 12 will pass through the coin changer 10 to be returned to a customer at a coin return 46. By actuation of the various doors 20, 22, and 26 and gates 36 and 38 the coin changer 10 is capable of directing an acceptable coin to a particular destination such as to one of the coin tubes 28–34 or the cashbox 44.

The programmable multiple coin tube changer 10 further includes a payout switch 50, 52, 54, and 56 associated with each of the coin tubes 28, 30, 32, and 34, respectively. Such payout switches 50–56 are typically used to operate payout mechanisms associated with each of the coin tubes 28, 30, 32, and 34. For example, when setting up the coin changer 10 it is not uncommon to load a stack of coins into each of the coin tubes 28, 30, 32, or 34 for subsequent payout or refund to a customer. However, in setting up the coin changer 10 service personnel may load too many coins in a particular coin tube and removal of one or more coins is desired. Actuation of one of the switches 50–56 once or several times will activate the payout mechanism and one or more coins will be return to the service personnel. The coin changer 10 also has an LED (light emitting diode) 58 for indicating to service personnel certain operations of the coin changer 10. An escrow lever or switch 60 is also a part of the multiple coin tube changer 10 and may be used to retrieve coins which have been placed into the coin changer 10 by a customer who has decided not to complete a purchase or transaction.

The coin tubes 28, 30, 32, and 34 are used for receiving and storing coins of different denominations such as for example nickels, dimes, quarters, and dollars. Although the United States coin set is shown here for illustrative purposes it is to be understood that other coins such as foreign currency or even tokens may be employed. Additionally, the multiple coin tube changer 10 may initially be configured so that coin tube 28 is used to receive dimes, coin tube 30 is used to receive nickels, coin tube 32 is used to receive quarters, and coin tube 34 is used to receive dollar coins. Other coin denominations may be accepted by the coin changer 10 and be directed to the cashbox 44. Further, the coin changer 10 may be initially manufactured or configured to accept a set of coins with one or more of the coins within the set being disabled. Being disabled is defined to be that those particular coins will not be accepted by the coin changer 10 but at some later time such coin or coins can be enabled to be accepted by the coin changer 10 to be stored in an appropriate coin tube or routed to the cashbox 44. The coin tubes 28, 30, 32, and 34 are sized and shaped to receive a particular denomination of coin. For example, as indicated above, coin tube 28 is sized and shaped to receive a dime. The coin tubes 28, 30, 32, and 34 are capable of being positioned and removed from the coin changer 10 so that any combination of coin tubes may be configured therein. Also, other different sized and shaped coin tubes, such as a coin tube sized and shaped to receive and store a penny, could be employed in the coin changer 10.

Figure 2:
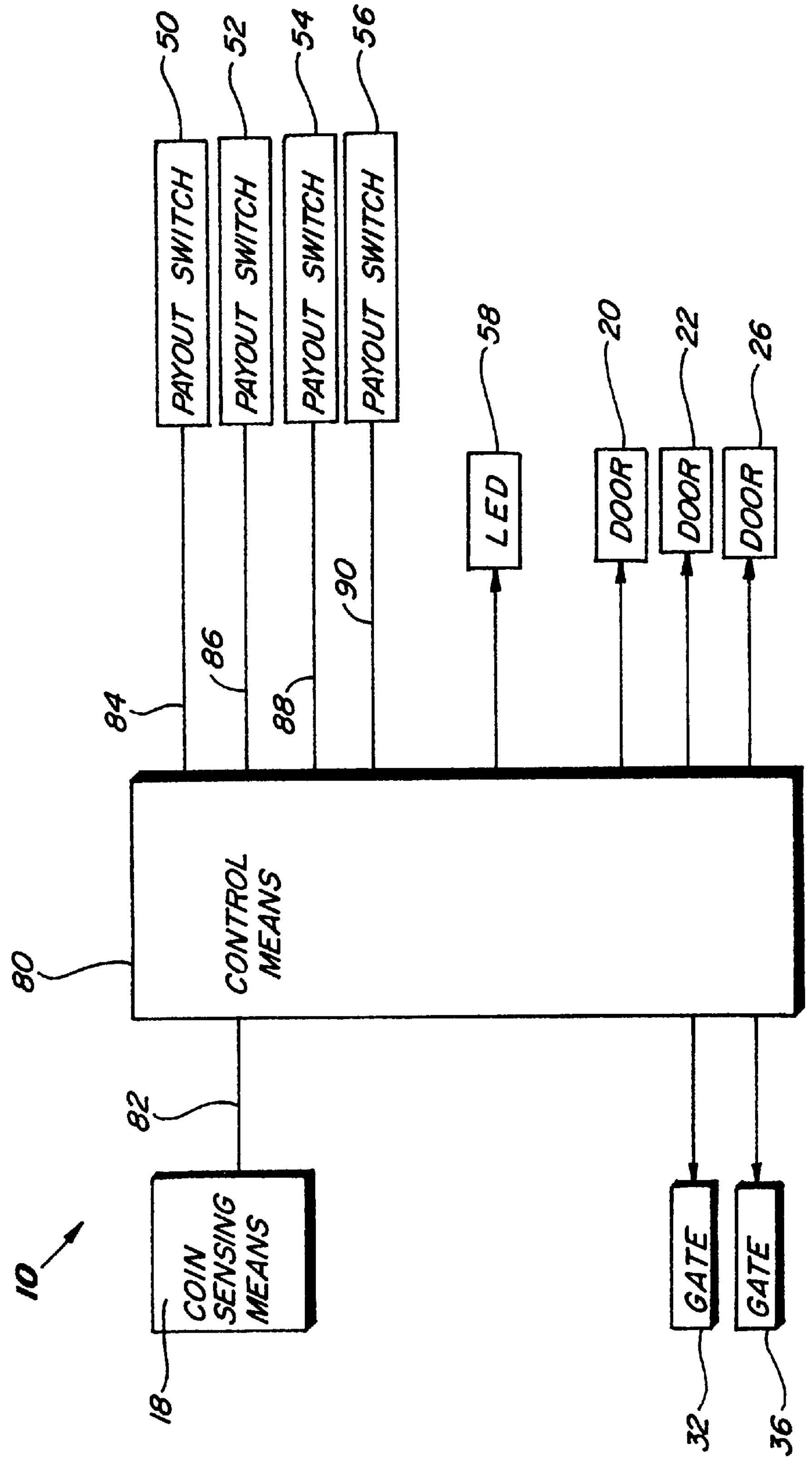
FIG. 2 is a block diagram of circuitry employed within the programmable multiple coin tube changer shown in FIG. 1.

Referring now to FIG. 2, a block diagram of some of the electronic circuitry employed within the programmable multiple coin tube changer 10 is shown to include a control means 80 which can take the form of a microprocessor, an ASIC (application specific integrated circuit) chip, microcontroller, or other suitable integrated circuit device or devices or other electronic circuitry. The control means 80 can have stored therein a program for controlling the operation of the coin changer 10 or such program can be stored in another device, as is well known. Additionally, the control means 80 may have a memory or memory means for storing other information such as the original configuration of the coin tubes 28–34, which coins are to be accepted by the changer 10, and which coins are disabled from being accepted by the changer 10. The control means 80 is connected to the coin sensing means 18 via a lead 82 with the coin sensing means 18 being used to provide data to the control means 80 from which the acceptability, validity, and/or denomination of each deposited coin can be determined. The control means 80 is operatively connected to the payout switches 50, 52, 54, and 56 over wires 84, 86, 88, and 90, respectively. The doors 20, 22, and 26 and the gates 36 and 38 are also connected to the control means 80. In this manner, the control means 80 is able to operate the doors 20, 22, and 26 and the gates 36 and 38 in order to direct a deposited coin to a desired destination or location within the multiple coin tube changer 10. The LED 58 is also connected to the control means 80. Other devices or elements may be connected to the control means 80, for example, the coin tube sensors 40 and 42 or the escrow switch 60. However, such connections are not shown in FIG. 2 for the sake of simplicity and clarity.

Typically the coin changer 10 may be originally manufactured with the coin tubes 28–34 configured so that coin tube 28 is used to receive dimes, coin tube 30 is used to receive nickels, coin tube 32 is used to receive quarters, and coin tube 34 is used to receive dollar coins. The coin changer 10 is also originally programmed so that particular coins are directed to a particular coin tube for example dimes are directed to the coin tube 28. In order to deviate from the factory setting service personnel must reconfigure the coin tubes 28–34 in any desired manner such as by removing the coin tube 28 and inserting a different coin tube into that position. For example, it may be determined that the coin changer 10 does not need to store dimes but it is advantageous to store more quarters. In this case the coin tube 28 would be removed and another coin tube for quarters, such as another coin tube 32, would be inserted into that position. The coin changer 10 would then have to be programmed for this new configuration of coin tubes.

In order to program the coin changer 10 so that the reconfiguration of the coin tubes are known by the coin changer 10 an input signal must be sent to the control means 80 so that the program which controls operation of the coin changer 10 or the control means 80 is able to enter into or initialize a payout configuration mode of operation. One form of a suitable input signal may be the pressing of a sequence of switches such as pressing and holding the payout switches 50, 52, and 56 at the same time and for a certain duration of time. Additionally, to verify that the coin changer 10 has entered into the payout configuration mode an indicating signal, such as by activating or illuminating the LED 58 in a particular sequence, may be used. Once the coin changer 10 is in the payout configuration mode one of the payout switches 50–56 for the associated coin tube which needs to programmed is pressed for a particular duration of time. The particular coin which is desired to be directed to the particular coin tube is then dropped into the inlet 14 and is then directed to the coin tube. Additionally, if a particular coin is to be accepted by the coin changer 10 and not stored in any of the coin tubes it may be programmed to be directed to the cashbox 44 by not pressing any of the switches 50–56 and depositing he coin into the inlet 14. Further, a coin can be disabled by pressing, for example, switches 50 and 56 simultaneously for a predetermined period and then dropping the coin into the inlet 14. Once the coin changer 10 has entered into the payout configuration mode and one or more of the payout switches 50–56 has been pressed another indicating signal may be used to verify that a coin may be sent through the coin changer 10. For example, once it is detected that one of the switches 50–56 has been pressed the LED 58 may be activated in a particular sequence. Once a new configuration of which coins are to be directed to each particular coin tube 28–34, which coins are to be directed to the cashbox 44, and which coins are to be disabled has been determined the control means 80 can have the new configuration stored in memory. After programming has been completed the payout configuration mode is exited by either depressing the escrow lever 60 for a duration of time or when no activity has been detected by the coin changer 10 for a predetermined period of time such as for 45 seconds.

Figure 3:
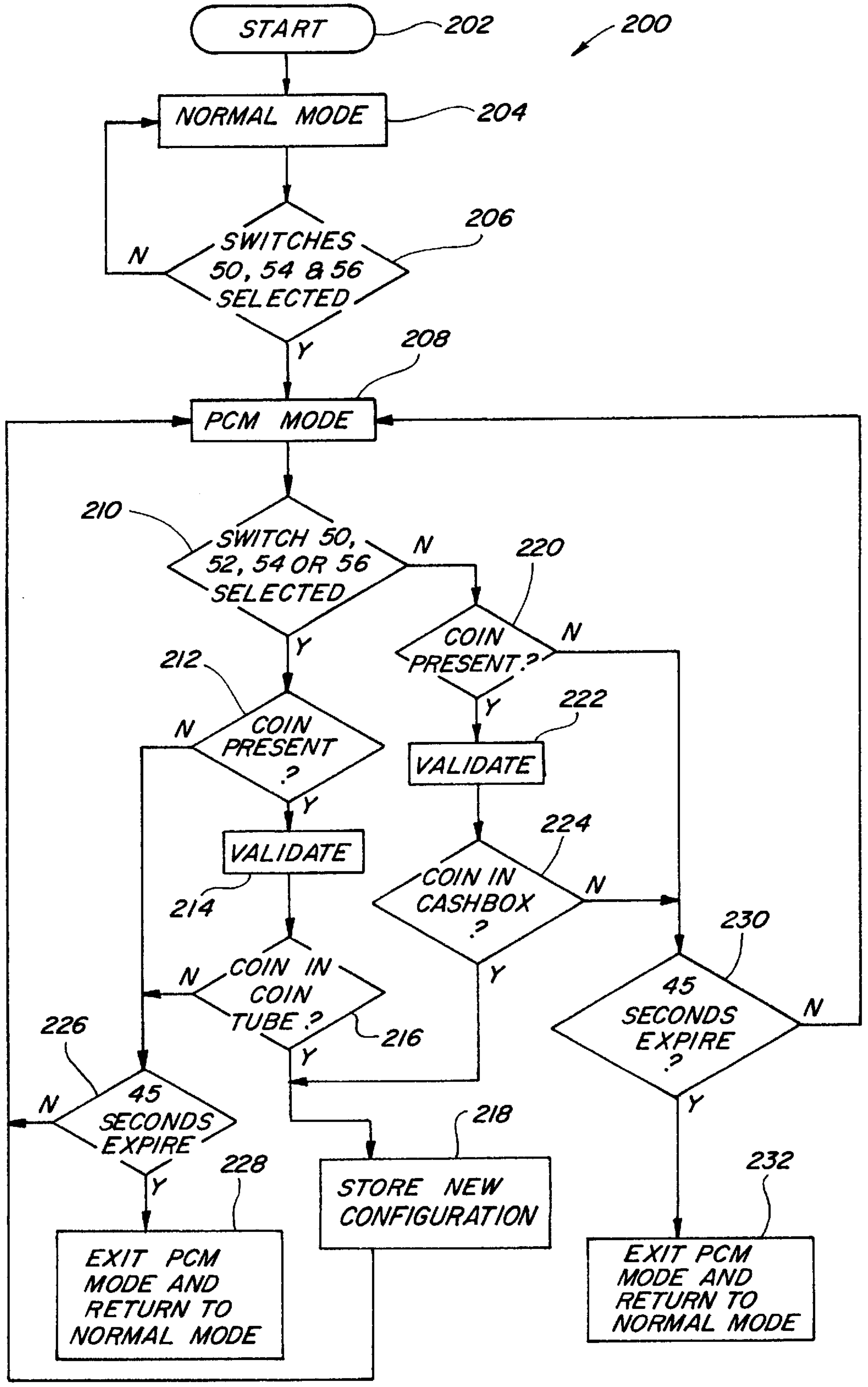
FIG. 3 is a flow chart illustrating operation of the programmable multiple coin tube changer shown in FIG. 1.

FIG. 3 shows a flow chart 200 of some of the important steps in operating the programmable multiple coin tube changer 10 which has been discussed hereinabove. Operation of the coin changer 10 begins at a start step 202 in which it is assumed that the coin changer 10 has had power applied and all initial operating conditions for the coin changer 10 have been satisfied. The program then enters to a step 204 in which the coin changer 10 is operating in a normal mode of operation such as the coin changer 10 is waiting for a customer to deposit a coin which is to be validated. Control of the program then continues to a step 206 in which it is determined whether the payout switches 50, 54, and 56 have been pressed for two seconds or more. If this combination of the payout switches 50, 54, and 56 have not been pressed or detected for this duration of time the program branches back to the step 204. On the other hand if this condition is present the program will continue to a step 208 in which the coin changer 10 will be in a payout configuration mode (PCM). The next step encountered by the program will be a step 210 in which it will be determined if one of the payout switches 50–56 has been pressed. If one of the switches 50–56 has been pressed, which represents that a particular coin is to be sent to one of the coin tubes 28–34 associated with the pressed switch, the program will then determine in a step 212 whether a coin has been detected by the coin changer 10. In a next step 214 the coin changer 10 will validate the deposited coin and control of the program will pass to a step 216. In step 216 it is determined whether the coin has entered into the coin tube 28–32 associated with the payout switch 50–56 which was selected in step 210. If the coin has entered the correct coin tube 28–32 then the program will store this information in a step 218 and the program will then loop back to step 208. This portion of the program corresponds to the operation in which a new coin tube has been placed in the coin changer 10 and the coin changer is programmed to remember the new configuration of coin tubes.

The situation in which a coin is to be accepted by the coin changer 10 and sent to the cashbox 44 appears at the NO branch of step 210 where the program continues to a step 220. In step 220 it is determined whether a coin is present. If a coin is present in the coin changer 10 the coin will then be validated in a step 222 and then it will be determined in a step 224 whether the coin has been directed to the cashbox 44. When the coin has successfully entered the cashbox 44 the program again branches to step 218 where the new configuration is stored. This portion of the program also provides for the coin changer 10 to recognize and accept coins which have been previously disabled by the coin changer 10 which are to be sent to the cashbox 44 instead of one of the coin tubes 28–34.

Additionally, it should be noted that in step 212 if it has been found that no coin is present or in step 216 if it has been found that the coin did not reach the correct coin tube then the program will continue to a step 226 in which it is determined whether 45 seconds, or any other predetermined time period, has elapsed. If this time period has expired with no other action being sensed or detected by the coin changer 10 then the program will proceed to a step 228 in which the payout configuration mode will be exited and the program will enter the normal mode of operation for the coin changer 10. Also, if it is determined in step 226 that the time period has not expired and the coin changer 10 has detected other actions the program will loop back to step 208.

In step 220, where it has been found that no coin is present or in step 224 that the coin has not made its way to the cashbox 44 the program will progress to a step 230 in which it is determined whether 45 seconds, or any other predetermined time period, has elapsed. If this period of time has elapsed then the program will continue to a step 232 where the payout configuration mode will end and the program will return to the normal mode of operation. As discussed above, instead of waiting for a predetermined period of time it is also possible to exit the payout configuration mode by some other action such as by pressing the escrow lever 60. However, such step is not illustrated in the flow chart 200.

Figure 4:
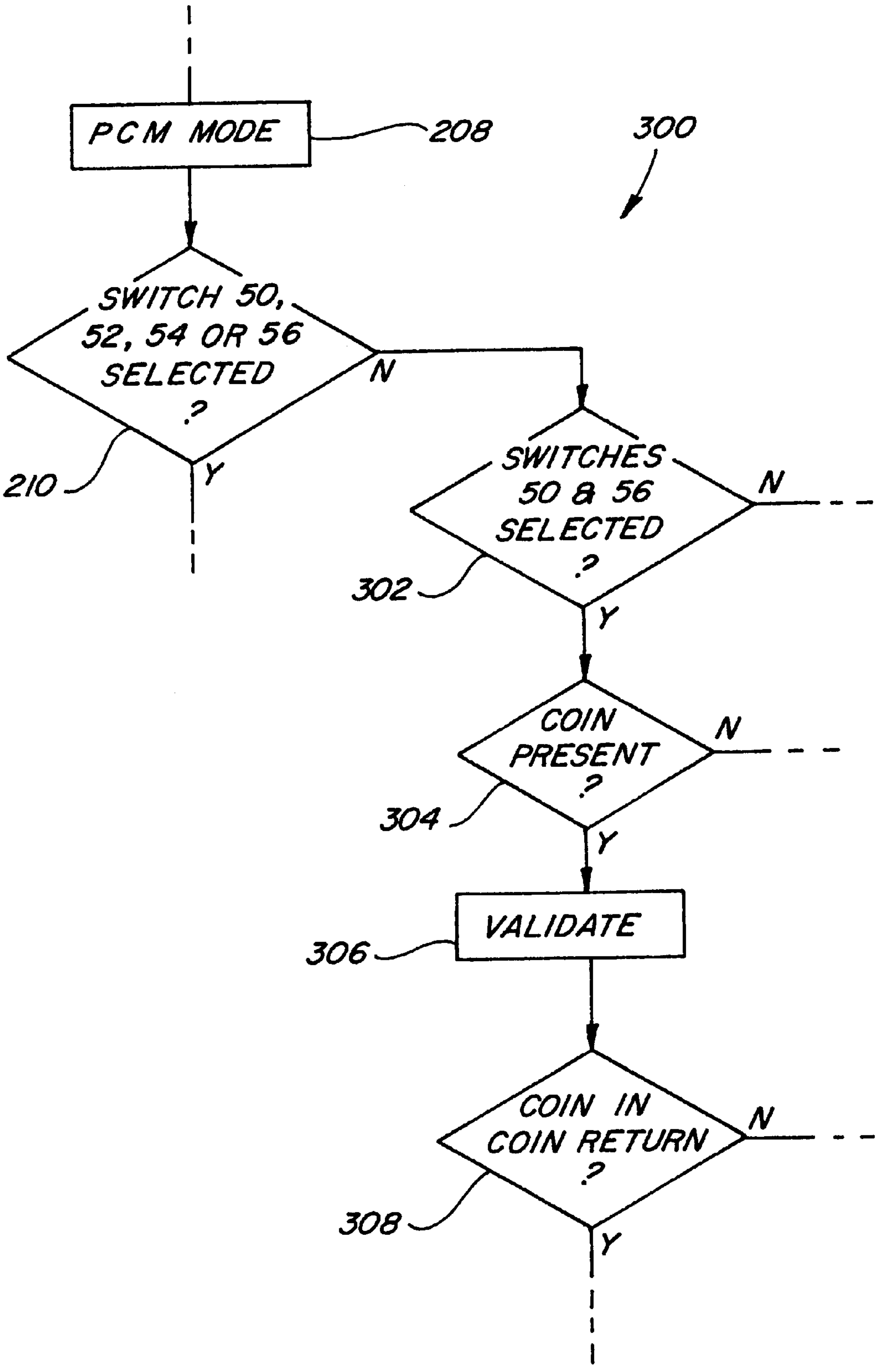
FIG. 4 is a flow chart illustrating further operation of the programmable multiple coin tube changer shown in FIG. 1.

The situation where a coin which was previously accepted by the coin changer 10 is disabled from being accepted is shown in FIG. 4 in a flow chart 300. It is assumed that the program has entered into the payout configuration mode at step 208 and none of the payout switches 50–56 have been individually selected and the program has branched to a step 302 in which it is determined that payout switches 50 and 56 have been pressed simultaneously. When the condition of the simultaneous depression of the switches 50 and 56 has occurred the program continues to a step 304 in which it is determined whether a coin is present. If a coin is present the program will proceed to a step 306 in which the coin will be validated and then in a step 308 it will be verified whether the coin has been routed to the coin return 46. In step 308, assuming the coin has ended up in the coin return 46, the program will continue to step 218 shown in FIG. 3. Further, in step 302, the NO branch proceeds to step 220 of the flow chart 200 while the NO branch of step 304 continues to step 230. To complete the explanation of the operation of the flow chart 300, both the NO branch for step 304 and the NO branch for step 308 will continue to step 230. In this manner, the program for the coin changer 10 in the payout configuration mode can disable one or more coins which have previously been accepted by the coin changer 10 and which were previously directed to either one or more of the coin tubes 28–32 or the cashbox 44. Once a coin has been disabled it is no longer accepted by the coin changer 10 and will be directed to the coin return 46.

From all that has been said, it will be clear that there has thus been shown and described herein a programmable multiple coin tube changer which fulfills the various objects and advantages sought therefor. It will be apparent to those skilled in the art, however, that many changes, modifications, variations, and other uses of the subject programmable multiple coin tube changer and method of operation of the programmable multiple coin tube changer are possible and contemplated. All changes, modifications, variations, and other uses and applications which do not depart from the spirit and scope of the invention are deemed to be covered by the invention, which is limited only by the claims which follow.

What is claimed is:

1. A programmable multiple coin tube changer for accepting and storing coins of different denominations, the changer comprising a plurality of coin tubes with each coin tube for storing one coin denomination and each coin tube being removable from the changer in order to reconfigure the coin tubes within the changer, means for initiating a payout configuration mode whenever a coin tube has been removed from the changer and replaced with a coin tube for storing a different coin denomination, means for selecting which one of the coin tubes has been replaced, means for routing a particular coin to the coin tube which has been replaced, and means for storing information corresponding to the coin tube which has been replaced and the particular coin which should be routed to the replaced coin tube.

2. The programmable multiple coin tube changer of claim 1 further comprising means for indicating when the payout configuration mode has been initiated.

3. The programmable multiple coin tube changer of claim 2 wherein the indicating means comprises a light emitting diode which is illuminated in a predetermined sequence.

4. The programmable multiple coin tube changer of claim 3 wherein the light emitting diode is illuminated in another predetermined sequence whenever a coin is being routed within the changer.

5. The programmable multiple coin tube changer of claim 1 wherein the initiating means comprises a payout switch associated with each of the coin tubes and actuation of the payout switches in a particular sequence initiates the payout configuration mode.

6. The programmable multiple coin tube changer of claim 1 wherein the selecting means comprises a payout switch associated with each of the coin tubes and actuation of one of the payout switches directs a particular coin to the coin tube associated with the payout switch which is actuated.

7. The programmable multiple coin tube changer of claim 1 wherein the storing means further comprises means for storing the denomination of the particular coin which has been routed to the selected coin tube.

8. A programmable multiple coin tube changer for accepting and storing a set of coins of different denominations and for rejecting one or more coins from within the set, the changer comprising a plurality of coin tubes with each coin tube for storing one coin denomination and each coin tube being removable from the changer in order to reconfigure the coin tubes within the changer, means for initiating a payout configuration mode whenever a coin which has been previously rejected by the changer needs to be accepted by the changer and whenever a coin tube has been removed from the changer and replaced with a coin tube for storing a coin which has been previously rejected, means for selecting which one of the coin tubes has been replaced, means for routing a previously rejected coin through the changer and to the coin tube which has been replaced, and means for storing information corresponding to the previously rejected coin which is now to be accepted by the changer and the coin tube which has been replaced.

9. The programmable multiple coin tube changer of claim 8 further comprising means for indicating when the payout configuration mode has been initiated.

10. The programmable multiple coin tube changer of claim 9 wherein the indicating means comprises a light emitting diode which is illuminated in a predetermined sequence.

11. The programmable multiple coin tube changer of claim 8 wherein the initiating means comprises a plurality of payout switches and actuation of the payout switches in a particular sequence initiates the payout configuration mode.

12. The programmable multiple coin tube changer of claim 8 wherein the routing means comprises means for determining the authenticity of the coin which is being routed within the changer.

13. The programmable multiple coin tube changer of claim 8 further comprising means for rejecting a coin which has previously been accepted by the changer.

14. The programmable multiple coin tube changer of claim 13 wherein the rejecting means comprises a plurality of payout switches and actuation of two or more of the payout switches in a particular sequence will cause the coin which is being routed within the changer to be rejected by the changer.

15. A programmable multiple coin tube changer for accepting and storing a set of coins of different denominations and for rejecting one or more coins from within the set, the changer comprising a plurality of coin tubes with each coin tube for storing one coin denomination and each coin tube being removable from the changer in order to reconfigure the coin tubes, a cashbox for storing coins, means for initiating a payout configuration mode whenever the coin tubes are reconfigured from an initial configuration to a subsequent configuration, the initiating means comprising a payout switch associated with each of the coin tubes and actuation of payout switches in a particular sequence initiates the payout configuration mode, means for selecting which one of the coin tubes or the cashbox are to store a particular coin, means for routing a particular coin to the coin tube or the cashbox which has been selected for storing that particular coin, and means for storing information corresponding to the coin tube or the cashbox which has been selected for storing that particular coin.

16. The programmable multiple coin tube changer of claim 15 further comprising means for indicating when the payout configuration mode has been initiated.

17. The programmable multiple coin tube changer of claim 16 wherein the indicating means comprises a light emitting diode which is illuminated in a predetermined sequence.

18. The programmable multiple coin tube changer of claim 17 wherein the light emitting diode is illuminated in another predetermined sequence whenever a coin is being routed within the changer.

19. The programmable multiple coin tube changer of claim 15 further comprising means for rejecting a coin which has previously been accepted by the changer.

* * * * *